United States Patent [19]

Goldberg et al.

[11] 4,356,507

[45] Oct. 26, 1982

[54] METHOD AND APPARATUS FOR DIGITAL TELEVISION ERROR CORRECTION WITHOUT OVERHEAD BITS

[75] Inventors: Abraham A. Goldberg; John P. Rossi, both of Stamford, Conn.

[73] Assignee: CBS Inc., New York, N.Y.

[21] Appl. No.: 220,864

[22] Filed: Dec. 29, 1980

[51] Int. Cl.³ ............................................... H04N 5/44
[52] U.S. Cl. ........................................ 358/13; 358/36;
     358/167; 371/30; 375/26
[58] Field of Search ............... 358/13, 21 R, 141, 160,
     358/166, 167, 36, 37; 371/30, 48; 375/25, 26,
     99, 102, 103, 104

[56] References Cited

U.S. PATENT DOCUMENTS

| | | | |
|---|---|---|---|
| 3,721,959 | 3/1973 | George | 375/10 |
| 4,291,331 | 9/1981 | Devereux | 358/13 |
| 4,295,221 | 10/1981 | Henoch | 375/99 |

OTHER PUBLICATIONS

A Digital Television Error-Protection Scheme based on Waveform Estimates, BBC Research Report 1978/19, Croll, Jun. 1978, pp. 1-10.
Pulse Code Modulation of Video Signals: Subjective Effect of Random Digit Errors, V. G. Devereux, BBC Report 1972/14, May 1972, pp. 1-5.

*Primary Examiner*—Michael A. Masinick
*Attorney, Agent, or Firm*—Spencer E. Olson

[57] ABSTRACT

Method and apparatus for detecting and significantly correcting bit errors in a pulse code modulated television signal which recognizes the unique spectral characteristics of isolated bit errors in a digital bit stream, which generate spectral energy outside the frequency band of the video signal, and utilizes that energy to detect and correct errors without the use of overhead bits.

13 Claims, 7 Drawing Figures

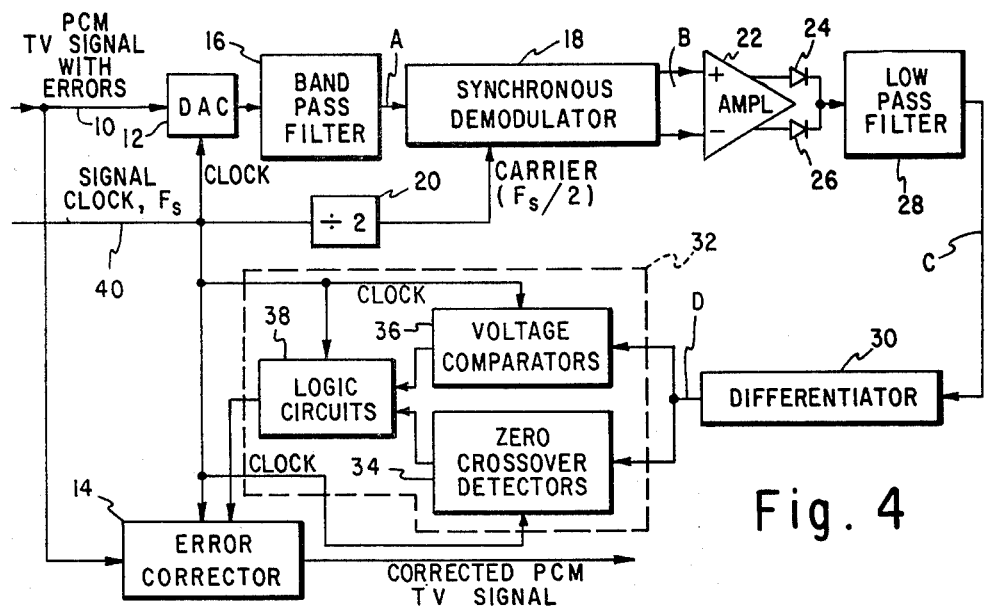
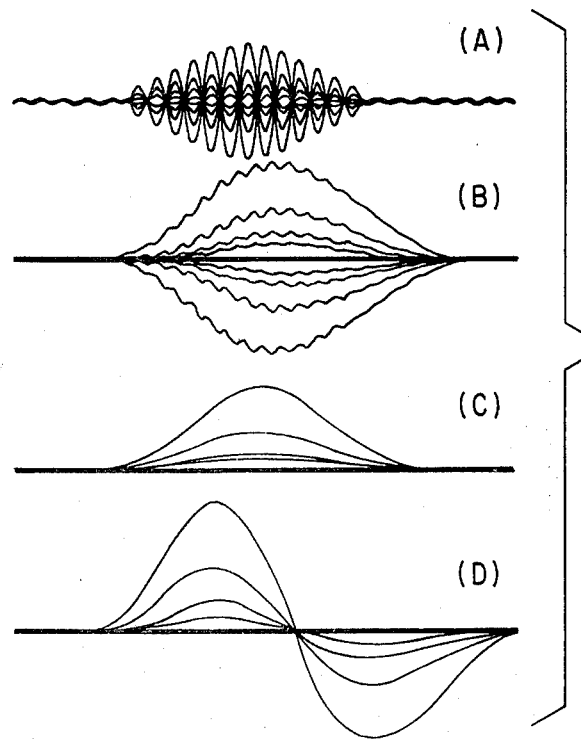
Fig. 4
Fig. 6

METHOD AND APPARATUS FOR DIGITAL TELEVISION ERROR CORRECTION WITHOUT OVERHEAD BITS

BACKGROUND OF THE INVENTION

This invention relates generally to television apparatus and, more particularly, to apparatus for correcting errors in pulse code modulated digital television signals.

The transmission, storage and processing of pulse code modulated (PCM) digital television signals in noisy channels subjects the digital signal to uncertainties and causes bit errors which appear as random bright and dark noise specks in the television picture. Heretofore, the usual way of dealing with such errors was to add parity bits to the digital signal to identify and correct the errors. Many error correcting codes utilizing interlinked parity bits have been developed for this purpose, but all require overhead bits to carry redundant information. Whenever there is a statistical probability of excessive errors being generated, the television system has had to carry the burden of such overhead bits in order to ensure satisfactory picture quality; the penalty is a higher total bit rate. Also, there may be situations where bit errors have occurred in a prior section of the television chain outside the control of a particular television plant; if the television signal lacks parity coding when received by the plant the bit error rate cannot be reduced using parity techniques.

The primary object of the present invention is to provide an improved method and apparatus for detecting and correcting bit errors in PCM digital television signals that does not require the use of overhead bits.

SUMMARY OF THE INVENTION

Briefly, this and other objects are accomplished by a spectral error correcting system the operation of which is based on the fact that an isolated bit error in a pulse code modulated digital television signal produces a spike in the video having spectral energy well beyond the frequency band of a composite color television signal. The principle applies to television signals of any standard, including NTSC, PAL and SECAM, but will be described herein as applied to the NTSC standard. It is assumed that the sampling frequency, $F_s$, is higher than twice the highest video signal $F_v$. Digital composite NTSC signals are typically sampled at frequencies equal to or greater than 2.5 $F_v$. In theory, an error-free digital NTSC television signal lacks energy in the neighborhood of $F_s/2$ and odd multiples thereof. Isolated bit errors, however, generate significant levels of energy in the region of $F_s/2$; thus, by measuring the energy appearing at $F_s/2$ the presence of bit errors can be established. Also, errors in the more significant bits of a sample generate higher energy than do errors in less significant bits; therefore, the amplitude of the signal measured in the region of $F_s/2$ is proportional to the significance of the bit in error, which identifies the bit and makes it correctable.

In accordance with the invention, the digital television signal is converted to analog form, and such energy as is present in the region of $F_s/2$ due to isolated bit errors passes through a linear-phase, sharp bandpass filter having a center frequency of $F_s/2$ and produces frequency bursts. The output from the filter is synchronously demodulated to produce pulses corresponding to the envelope of the frequency burst, the peak of which is representative of the location of the sample in error and the amplitude of which is indicative of the significance of the bit in error. The envelope pulses are processed to determine the location of the errors in the digital television signal, and the significance of the bits in error, and correction is applied to the digital signal by simply inverting the appropriate bit in the sample that was found to be in error. Subjective tests have shown that the system significantly reduces the bit error rate of a PCM television signal.

BRIEF DESCRIPTION OF THE DRAWINGS

Other objects, features and advantages of the invention will become apparent, and its construction and operation better understood, from the following detailed description, taken in conjunction with the accompanying drawings, in which:

FIG. 4 is a block diagram of a preferred form of error detector/corrector system embodying the invention;

FIGS. 6A–6D are a series of waveforms depicting signals developed at various points in the system of FIG. 4, useful to the understanding of its operation.

DESCRIPTION OF THE PREFERRED EMBODIMENT

The operating principle of the spectral error correcting system according to the invention is based on the act that an isolated bit error in a PCM digital television signal produces a spike in the video, having spectral energy well beyond the frequency band of a composite color television video signal. The invention will be described as implemented for the NTSC color standard, but the same principle applies to television signals of any standard.

Figure 1A:
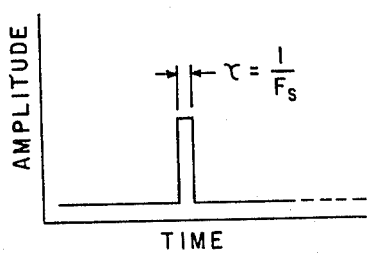
FIGS. 1A and 1B respectively illustrate the characteristics of an isolated pulse in the time domain and the frequency domain.
Figure 1B:
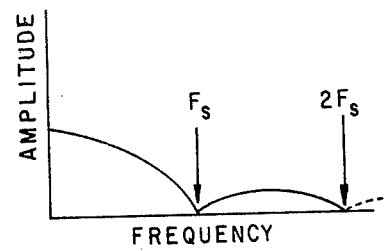

An isolated bit error results in an isolated pulse of width $\tau$ as shown in FIG. 1A in the time domain, the spectral energy of which, shown in FIG. 1B, has a (sin x)/x response, with the first null occurring at the PCM sampling frequency $F_s$, equal to $1/\tau$. This isolated bit error causes the digital sample to be incorrect.

Figure 2:
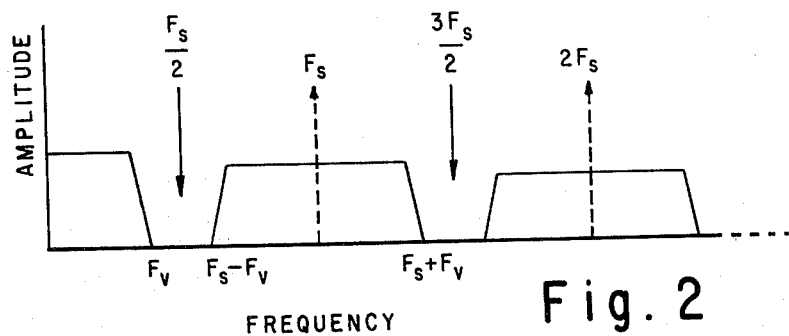
FIG. 2 is a diagram of the spectrum of a television signal of bandwidth $F_v$, PCM-encoded at a sampling rate of $F_s$.
Figure 3:
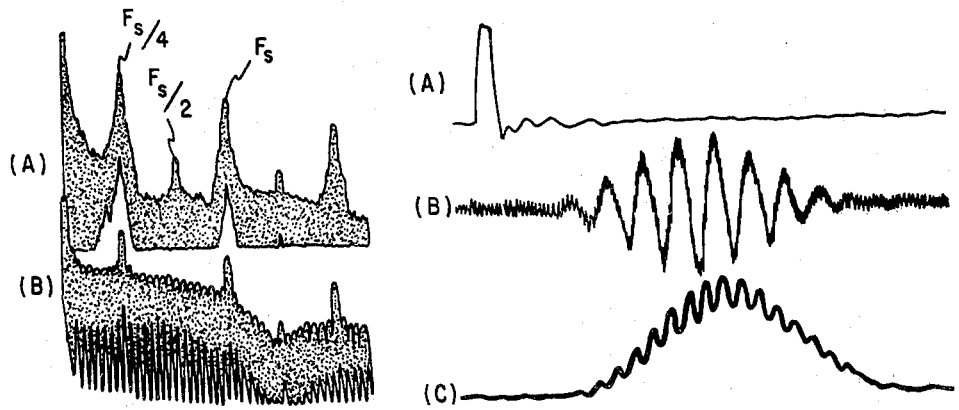
FIG. 3(A) is a reproduction of an oscillogram of the frequency spectrum in the analog domain of an error-free composite digital television signal sampled at 14.3 MHz.
FIG. 3(B) shows the frequency spectrum of the same video signal when its most significant bit (MSB) is in error once every 34 samples.

As the period of each sample in the digital television signal is $1/F_s$, the incorrect codeword generates spectral energy having a (sin x)/x characteristic with its first null at $F_s$. The sampling frequency is normally more than twice the highest video baseband frequency, $F_v$, except in the case of sub-Nyquist sampled systems. Translated to the analog domain, the spectrum of the digital television signal consists of the baseband signal $F_v$, and the upper and lower sidebands around the sampling frequency $F_s$, and its harmonics, as shown in FIG. 2. In theory, an error-free digital television signal lacks energy in the neighborhood of $F_s/2$ and odd multiples thereof. Isolated bit errors, however, generate significant levels of energy in the region of $F_s/2$, as will be evident from comparison of waveforms (A) and (B) of FIG. 3. Waveform (A) is a reproduction of an oscillogram of the frequency spectrum from zero to 20 MHz of an error-free composite digital television video signal (split field color bars) sampled at 14.3 MHz. The signal of $F_s/2$ or 7.15 MHz is the second harmonic energy of the 3.58 MHz color subcarrier, $F_s/4$. Waveform (B) shows the frequency spectrum of the same video signal when its most significant bit (MSB) is in error once every 34 samples. From these waveforms applicants recognized that the presence of bit errors could be determined by measuring the energy in the region of $F_s/2$, and also that errors in the more significant bits of a sample will generate higher energy than errors in less significant bits. Once having recognized the desirability and advantages of doing so, it is relatively easy to extract error energy at $F_s/2$ by means of a bandpass filter, but it remained to devise a system to utilize that energy to determine the exact location and significance of the bit in error and then to correct it.

An earlier attempt by the British Broadcasting Corporation to implement an error detector utilizing spectral detection principles, described in BBC Research Department Report No. BBC RD 1978/19, June 1978, entitled "A Digital Television Error-Protection Scheme Based On Waveform Estimates," resulted in a system that was, according to the report, complex, performed marginally, and used more costly circuits than conventional error protection systems. The BBC approach was considerably different than the present implementation in that a digital transversal filter was employed to determine the bits in error, the limited performance of which contributed significantly to the less than satisfactory performance of the system.

A difficulty with implementing a spectral error detector lies in the fact that a digital television signal normally contains wideband quantization error noise and other signal-related harmonic energy around $F_s/2$, even in the absence of errors. This noise interferes with the detection of bit errors and makes it virtually impossible reliably to detect errors in the four least significant bits (LSB) of 8-bit samples. As reported by V. G. Devereux and D. J. Meares in BBC Research Department Report No. 1972/14, 1972, entitled "Pulse Code Modulation Of Video Signals: Subjective Effect Of Random Digit Errors," it has been determined that errors in the four LSB's have a minimal subjective effect on picture quality for the reason that the amplitude of error specks in the picture are 24 to 42 db below those due to errors in the MSB. Therefore, the system to be described was implemented to correct errors only in the four MSB's and was found to still provide excellent results.

Figure 5:
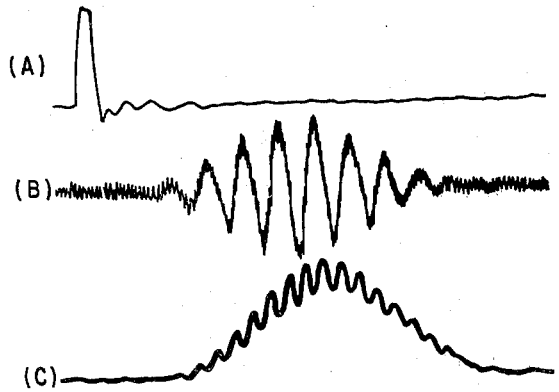
FIGS. 5A–5C are a family of waveforms useful to an understanding of the operation of the system of FIG. 4.

Referring to the block diagram of FIG. 4 of a preferred embodiment of the spectral error detector/corrector system, a PCM-encoded digital television video signal on input line 10, containing isolated bit errors, is applied to a wideband digital-to-analog converter 12 for converting it to analog form, and also to the input terminal of an error corrector 14, to be described later. The D/A converter 12, of conventional design, such as the Type TDC-1016J commercially available from TRW, is controlled by the signal's clock, of a frequency $F_s$, and the resulting analog signal is fed to a linear-phase, sharp bandpass filter 16 having a center frequency of substantially $F_s/2$, in the present embodiment, 7.16 MHz. Filter 16, which may be a Type F963 linear-phase filter available from Allen Avionics, responds to energy within its passband by ringing symmetrically about the center frequency $F_s/2$, as illustrated in FIG. 5. Waveform (A) shows an isolated bit error in the video, and waveform (B) shows the symmetrical frequency burst produced at the output of bandpass filter 16 in response to the spike in the video. If the video signal contains well spaced random errors in the various four most significant bits, the bandpass filter output will contain multi-level, biphase bursts; such random error-caused bursts are shown superimposed in the waveform (A) of FIG. 6.

In order to utilize the thus detected bit error for error correction, the error bursts from bandpass filter 16 are first demodulated by a synchronous demodulator 18 controlled by the clock of the digital signal divided by two by a suitable divider 20. Synchronous demodulator 18, which may be a Type MC1596 demodulator circuit commercially available from Motorola Semiconductor, produces an envelope of the isolated error frequency burst, as shown in waveform (C) of FIG. 5. In the general case of isolated random errors, a family of envelopes will result, as shown in waveform (B) of FIG. 6, and inasmuch as bit errors may appear as either positive or negative spikes in the video signal, the envelopes can be either positive or negative polarity pulses, also shown in waveform (B) of FIG. 6.

The envelope pulses from synchronous demodulator 18 are amplified and full-wave rectified by means of a differential DC-coupled amplifier 22 and two diodes 24 and 26, the cathodes of which are connected together and to the input terminal of a lowpass filter 28 which removes any residual carrier, as well as high frequency noise, from the rectified envelope pulses. The amplitude of each error pulse at this stage is directly proportional to the significance of the bit in error. The waveform (C) of FIG. 6 shows, superimposed, filtered error envelope pulses associated with isolated random errors in bits of differing significance, the pulse having the greatest amplitude being associated with the most significant bit, and the lowest amplitude pulse being associated with the fourth MSB. The center, or peak, of the envelope pulses provide a fixed reference for the location of the error. The waveform (C) of FIG. 6 can be considered to be an "eye" pattern, from which valid decisions can be made as long as the eyes are open.

To facilitate location of bit errors, the filtered envelope pulses are fed to a differentiator 30 which converts the peak of each pulse to a well-defined zero crossover point, shown in waveform (D) of FIG. 6, so as to enable a zero crossover detector to establish the precise location of the error. (The slight displacement to the right of the zero crossover point from the peaks of the pulses in waveform (C) is due to circuit delays, which do not, however, affect the ability of the system to precisely locate the position of an error.) The differentiated error signal is fed to an error location and error level detector 32, including the functions of a zero crossover detector 34, a bank of voltage comparators 36 of conventional design differently biased by related voltages for establishing the amplitude of the error signal, and logic circuits operable to determine which of thwe four MSB's is in error. The error location and error level detector 32, under control of the clock of the digital television signal on input line 10, controls error corrector 14 to apply correction to the digital television signal by simply inverting the appropriate bit in the sample that the system found to be in error.

The described system is also capable of detecting the presence of errors that are less than one microsecond apart by monitoring the half-amplitude width of the error pulse envelope. If the half-amplitude width exceeds approximately 600 nsec it is assumed that more than one error has occurred within a one microsecond period and error correction is inhibited. In this case, error masking by substituting a nearby sample for the sample in error will be more effective. Furthermore, after a correction takes place, the system is automatically inhibited from making another correction during the following 600 nsec period, to prevent making corrections when error detection is ambiguous.

All of the aforementioned detection time periods are strictly a function of the bandwidth of bandpass filter 16. Use of a narrower bandwidth will result in a wider error pulse envelope and would require greater isolation between errors in order accurately to detect their location. A wider bandwidth filter will create a narrower error envelope, but will increase the vulnerability of the system to noise and harmonics of the video signal. In a circuit that has produced excellent, although not necessarily optimum results, where $F_s=14.32$ MHz, the bandpass filter 16 has a center frequency of 7.16 MHz, a $-3$ db bandwidth of 1.1 MHz and a $-20$ db bandwidth of 2.7 MHz. The group delay is constant across a bandwidth of 2.5 MHz.

The described system has operated successfully with a variety of television signals, such as telecine test slides and electronically generated test signals. These video signals were band limited to 5.5 MHz and PCM-encoded at four times the NTSC color subcarrier frequency ($F_s=4_{sc}=14.3$ MHz). One of the tests to which the system was subjected involved the introduction of quantities of single bit errors into any of the four most significant bits every 15 to 20 samples, error detection decisions were monitored, and the corrected video signal viewed on color and monochrome television monitors. All bit errors in the first and second MSB's were corrected and no specks were seen on the television monitors. Conceivably, errors occurring at the edge of a video transition will have the effect of widening the transition by 70 nsec, and might not be visible in the picture, nor exhibit the characteristics of isolated errors; under these circumstances, they will not be detected.

Tests of the system also included measurements of the number of error detections for various rates of error insertions, split field color bars having been used during these measurements. The performance of the spectral error corrector with intentionally introduced isolated errors is summarized in the following Table I:

TABLE I

| Bit With Error | MSB | 2nd MSB | 3rd MSB | 4th MSB |
|---|---|---|---|---|
| Inserted errors/sec. | 894,887 | 894,887 | 894,887 | 894,887 |
| Detected errors/sec. | 894,887 | 894,886 | 893,199 | 883,586 |
| Undetected errors | 0 | 1 | 1,688 | 11,301 |
| Possible error rate improvement | $>10^6$ | $=10^6$ | $=530$ to 1 | $=79$ to 1 |

Errors in the first and second most significant bits are almost all corrected; that is; a bit error rate improvement of approximately $10^6$ is achieved for the two most significant bits. For the third MSB there was approximately one error detection failure for every 500 errors; however, error detection may have been masked by video transitions adjacent to and in the same direction as the errors. This type of error, however, is not visible in the television picture. The television picture displayed less than 30 random errors per frame; thus, since approximately 30,000 errors per frame were being inserted, an apparent error rate improvement of $10^3$ was achieved.

Noise jitter in the zero crossover detector, due to spurious television signal harmonics and other noise getting through bandpass filter 16, has the most serious impact on the correction of errors in the fourth most significant bit. It will be noted from waveform (C) of FIG. 6 that the fourth MSB has the smallest eye and is, therefore, most vulnerable. As shown in Table I, several hundred errors per frame remained uncorrected, from which it is estimated that only one order of magnitude error reduction was achieved in the fourth MSB.

Error correction performance in the third and fourth MSB is also affected by the content of the video signal. Some deterioration in performance was observed in picture areas containing high frequencies that generate out of band harmonics capable of passing through bandpass filter 16.

The performance of the system was also checked with pseudo random errors. A pseudo random error generator, designed for this purpose, permitted random errors to be inserted into any or all of the bits of a sample. The performance of the system with random errors was essentially as predicted: as long as the errors were not closer together than one microsecond (it is conceded that such errors are not truly random), errors in the first and second MSB's were readily corrected, even at a bit error rate of $10^{-2}$. Occasional failures to correct the third and fourth MSB were barely visible and not objectionable. Even though the four LSB's were not corrected, this had a negligible effect on the subjective quality of the picture, bearing out the findings reported in the aforementioned BBC Report No. 1972/14.

When truly pseudo random errors are added to the digital bit stream, the performance of the system is decreased due to the occurrence of errors in samples being less than one microsecond apart. Statistically, this does not pose a major problem. For example, a bit error rate of $10^{-5}$ has a $10^{-6}$ probability of two errors occurring less than one microsecond apart (i.e., closer than 15 samples). However, the probability that two such errors will occur in the four MBS's is $3.1 \times 10^{-7}$. The probability that they will occur in the first and second MSB's is $7.8 \times 10^{-8}$. There are many cases when errors in the first and second MSB's can be corrected even when nearby errors are present in the third or fourth MSB's. Additional logic in the system inhibits error correction during unfavorable conditions and improves performance at high bit error rates. As a result, a bit error rate of $10^{-5}$ is subjectively reduced to less than $10^{-7}$. Digital video signals with an error rate of $10^{-4}$ produce pictures that appear to contain no more than an error rate of $10^{-6}$. A threshold is reached at error rates of $10^{-3}$ that can be corrected to look like $10^{-4}$, but the picture quality remains unacceptable. At bit error rates of $10^{-2}$, the system removes almost half of the errors, but many of the remaining errors are spread out and there is no net improvement in picture quality.

It will be appreciated that the described technique of error detection/correction relies on the existence of a spectrum band ordinarily not utilized by the digital television signal. Except in special situations, such as sub-Nyquist encoding, this unused frequency band will normally exist; however, it can be contaminated by improper filtering of the video signal prior to PCM encoding, by harmonic distortions generated within the encoder, and by quantization errors. The effectiveness of the described technique depends on the ratio of the sampling frequency ($F_s$) to the highest video frequency ($F_v$); the higher this ratio the wider will be the frequency band available to detect errors. Present practice for digital composite NTSC signals calls for $F_s/F_v$ to be 2.5 to 3. Ratios lower than this will add complexity in many video processes, particularly filtering operations, which would of course limit the effectiveness of a spectral error corrector circuit.

It will be evident from the foregoing description that the present spectral error correction system has the important advantage that overhead bits are not required to be added to the digital signal to effect error correction. Additionally, a recipient of a PCM-encoded television signal from a remote source has the option of employing error correction without the active cooperation of the sender of the signal.

We claim:

1. A method of detecting and correcting bit errors contained in a PCM-encoded digital television signal encoded at a sampling frequency $F_s$, comprising the steps of:
  converting said digital television signal to an analog television signal;
  band-pass filtering said analog signal at a center response frequency of substantially $F_s/2$ for producing responsively to bit errors frequency bursts of differing levels according to the significance of the bit in error;
  demodulating said frequency bursts for producing envelopes thereof each representative of the location and significance of the bits in error;
  determining the location of the bits in error and their significance; and
  correcting said bit errors by inverting the bits in said digital television signal that were found to be in error.

2. The method according to claim 1, including the further steps of
  full-wave rectifying said envelope pulses; and
  differentiating said rectified envelope pulses for converting the peaks thereof to zero crossover points which establish fixed references for location of the errors.

3. The method according to claim 2, including the further step of removing by filtering any residual carrier signal and high frequency noise from said rectified envelope pulses before differentiation.

4. The method according to claim 1 or claim 2 or claim 3, wherein said filtered analog signal is synchronously demodulated at a frequency $F_s/2$.

5. Apparatus for detecting and correcting bit errors contained in a PCM-encoded digital television signal encoded at a sampling frequency $F_s$, comprising, in combination:
  means for converting said digital television signal to an analog television signal;
  bandpass filter means having a center response frequency of substantially $F_s/2$ for filtering said analog television signal and producing responsively to bit errors frequency bursts of differing levels depending on the significance of the bit in error;
  means including a demodulator for demodulating the output of said bandpass filter means for producing envelope pulses the amplitude of which is directly proportional to the significance of the bit in error and the peaks of which establish fixed references for determining the locations of the bit errors; and
  means operable responsively to said envelope pulses for correcting said bit errors by inverting the bits in said digital television signal that were found to be in error.

6. Apparatus according to claim 5, wherein the means including said demodulator further includes
  means for full-wave rectifying the said envelope pulses produced by said demodulator, and
  means for differentiating the rectified envelope pulses for converting the peaks thereof to zero crossover points which establish fixed references for determining the location of bit errors.

7. Apparatus according to claim 6, wherein said apparatus further comprises:
  means for low pass filtering said rectified envelope pulses before differentiation for removing therefrom any remaining carrier signal and high frequency noise.

8. Apparatus according to claim 6, wherein the means operable responsively to said envelope pulses for correcting said bit errors comprises:
  means for detecting said zero crossover points and determining the location in said digital television signal of bit errors; and
  means for determining the amplitudes of said envelope pulses for determining which of a predetermined number of most significant bits in a sample is in error.

9. Apparatus according to claim 8, wherein said predetermined number of most significant bits is equal to four.

10. Apparatus according to claim 5 or claim 6, wherein said digital television signal is an NTSC color television signal PCM-encoded at a sampling frequency of 14.3 MHz, and said bandpass filter means has a center frequency of 7.16 MHz, a $-3$ db bandwidth of substantially 1.1 MHz, and a $-20$ db bandwidth of substantially 2.7 MHz.

11. Apparatus for detecting and correcting bit errors contained in the four most significant bits of a PCM-encoded digital television signal encoded at a sampling frequency $F_s$, comprising, in combination:
  means for converting said digital television signal to an analog television signal in which bit errors, if present, appear as voltage impulses having energy in the region of $F_s/2$ of the frequency spectrum of said analog television signal;
  linear-phase, sharp bandpass filter means having a center response frequency of substantially $F_s/2$ for producing responsively to voltage impulses in said analog television signal frequency bursts of differing amplitudes according to the significance of the bit that caused the voltage impulse;
  means for synchronously demodulating said frequency bursts for producing envelope pulses having amplitudes directly proportional to the significance of the bit in error, the peaks of which establish references for determining the locations in the digital television signal of the bit errors;
  means for converting the peaks of said envelope pulses to zero crossover points for establishing precise references for determining the location of bit errors; and
  error correcting means including error location and error level detecting means including means for detecting said zero crossover points and for determining the amplitudes of said envelope pulses operable to correct said bit errors by inverting the bits in said digital television signal that were found to be in error.

12. Apparatus according to claim 11, wherein said means for converting the peaks of said envelope pulses to zero crossover points comprises:
   means for full-wave rectifying said envelope pulses, and
   means for differentiating the rectified envelope pulses for converting the peaks thereof to precisely located zero crossover points.

13. Apparatus according to claim 12, wherein said apparatus further includes:
   means for low pass filtering said rectified envelope pulses before differentiation for removing therefrom any remaining carrier signal and high frequency noise.

* * * * *